US010065776B2

(12) United States Patent
Prevot et al.

(10) Patent No.: US 10,065,776 B2
(45) Date of Patent: Sep. 4, 2018

(54) CLAMPING COLLAR WITH A TRANSVERSE BUCKLE

(71) Applicant: ETABLISSEMENTS CAILLAU, Issy-les-Moulineaux (FR)

(72) Inventors: Fabrice Prevot, Selles sur Cher (FR); Nicolas Rigollet, Romorantin (FR); Arnaud Jacquelin, Mur de Sologne (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 55 days.

(21) Appl. No.: 15/321,073

(22) PCT Filed: Jun. 22, 2015

(86) PCT No.: PCT/FR2015/051644
§ 371 (c)(1),
(2) Date: Dec. 21, 2016

(87) PCT Pub. No.: WO2015/197959
PCT Pub. Date: Dec. 30, 2015

(65) Prior Publication Data
US 2017/0158399 A1    Jun. 8, 2017

(30) Foreign Application Priority Data

Jun. 23, 2014 (FR) ...................................... 14 55794

(51) Int. Cl.
*B65D 63/08* (2006.01)
*F16B 2/08* (2006.01)

(52) U.S. Cl.
CPC ................ *B65D 63/08* (2013.01); *F16B 2/08* (2013.01)

(58) Field of Classification Search
CPC .................................. B65D 63/08; F16B 2/08
See application file for complete search history.

(56) References Cited

U.S. PATENT DOCUMENTS

| 193,946 | A | * | 8/1877 | Hamilton | ............... | B65D 63/08 |
| | | | | | | 217/91 |
| 1,241,301 | A | * | 9/1917 | Taylor | ................... | B65D 63/08 |
| | | | | | | 24/23 B |

(Continued)

FOREIGN PATENT DOCUMENTS

| DE | 201 04 180 | 6/2001 |
| EP | 1 775 220 | 4/2007 |
| GB | 2 254 105 | 9/1992 |

OTHER PUBLICATIONS

International Search Report dated Oct. 14, 2015 for corresponding international patent application No. PCT/FR2015/051644.

*Primary Examiner* — David M Upchurch
(74) *Attorney, Agent, or Firm* — Fay Sharpe LLP; James E. Scarbrough

(57) ABSTRACT

A clamping collar comprising a looped metal strap (10), and a transverse buckle (12) retained at the first end of the strap. On the outer side, the buckle forms a passage (13) through which the second end of the strap (10B) is inserted. The buckle has an inner portion (14) that is disposed against the inner face of the first end of the strap and that has a blocking transverse edge (14A) that co-operates with a blocking transverse stop (16A) of the first end of the strap that defines a blocking setback (16). The second end (10B) of the strap has a retaining transverse stop (11) received in the blocking setback (16) and co-operating in abutment with a retaining edge (17A) of said blocking setback to retain the second end of the strap to prevent it from moving in the direction in which the diameter of the collar increases.

14 Claims, 4 Drawing Sheets

(56) References Cited

U.S. PATENT DOCUMENTS

| | | | | |
|---|---|---|---|---|
| 1,517,515 | A * | 12/1924 | McGary | B65D 63/06 24/23 R |
| 3,311,957 | A * | 4/1967 | Dunn | F16L 33/035 24/20 EE |
| 3,587,142 | A * | 6/1971 | Scaravelli | F16L 33/14 24/268 |
| 4,765,032 | A * | 8/1988 | Fortsch | B65D 63/06 24/23 R |
| 4,868,953 | A * | 9/1989 | Fortsch | B65D 63/06 24/23 R |
| 7,373,695 | B2 * | 5/2008 | Caveney | B65B 13/027 140/150 |
| 2009/0144947 | A1 * | 6/2009 | Dorneman | B21D 22/04 24/16 R |
| 2013/0007992 | A1 * | 1/2013 | Gingell | B01J 8/0207 24/20 EE |
| 2017/0096269 | A1 * | 4/2017 | Marelin | B65D 63/04 |
| 2017/0129669 | A1 * | 5/2017 | Rutfy | B65D 63/08 |

* cited by examiner

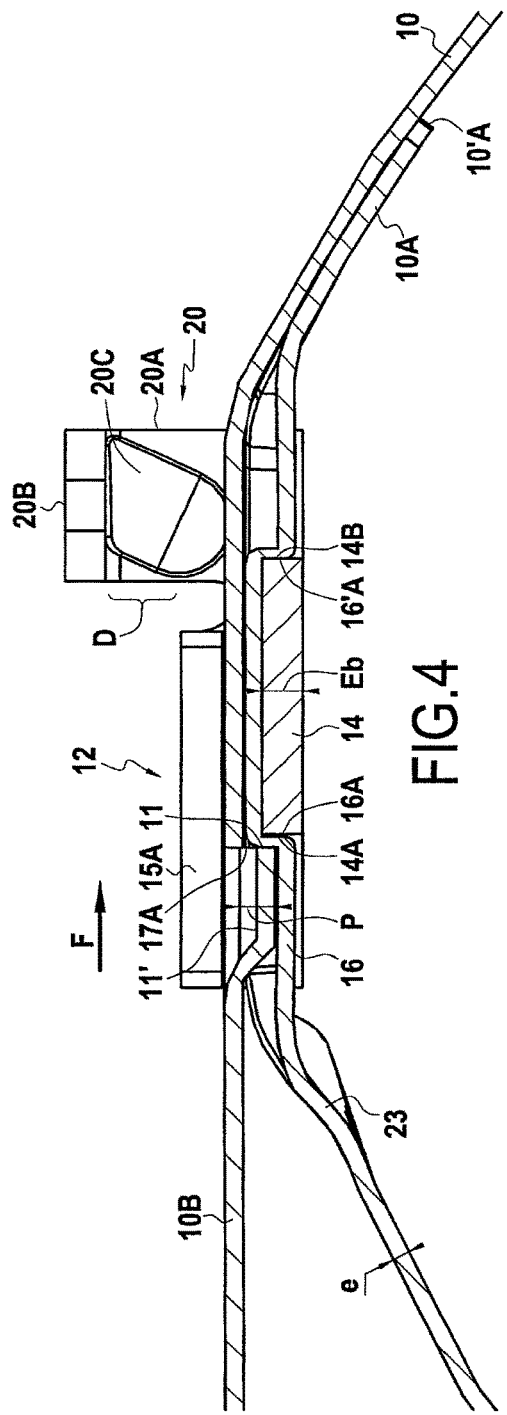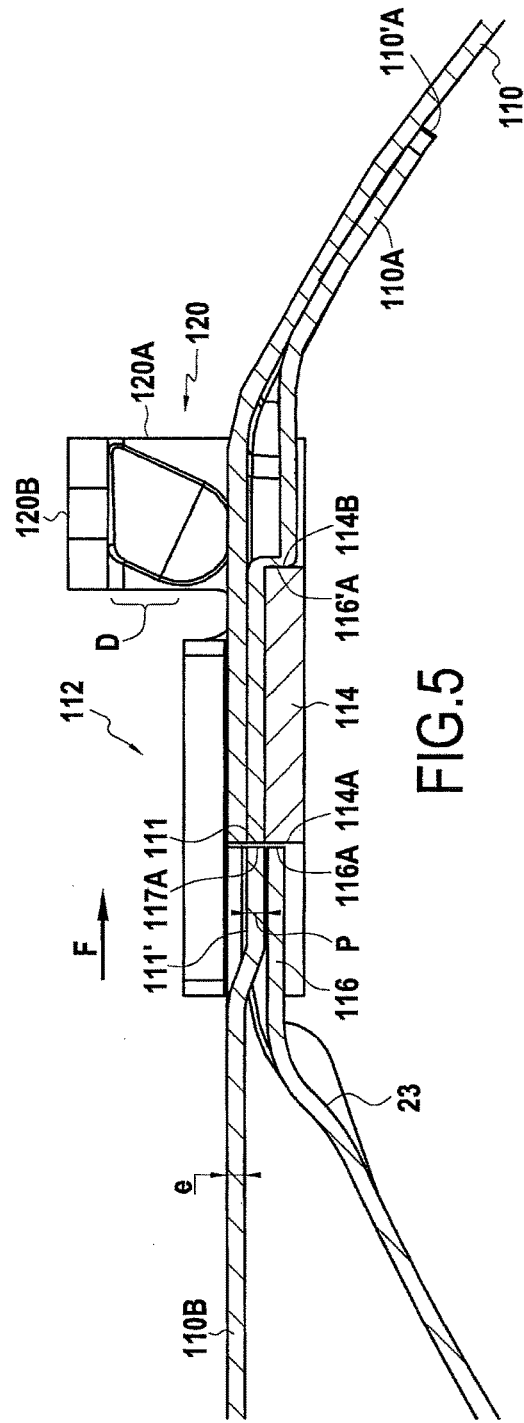

CLAMPING COLLAR WITH A TRANSVERSE BUCKLE

The present invention relates to a clamping collar comprising a looped metal strap, and a transverse buckle retained at the first end of the strap and forming, on the outer side of said first end, a passage through which the second end of the strap is inserted, the buckle having an inner portion that is disposed against the inner face of the first end of the strap and that has a blocking transverse edge that faces in the opposite direction from the direction in which the free tip of the first end of the strap faces, and that co-operates with a blocking transverse stop of the first end of the strap that defines a blocking setback formed in said first end.

A collar of that type is known, for example, from Patent EP 1 775 220. In that known collar, the buckle has two openings in register with each other in its inner and outer faces, and the first end of the strap also has an opening that is in register with the openings in the buckle. To tighten the collar around an article, the strap is looped back around the article, the second end of the strap is inserted through the passage in the buckle, traction is exerted on the second end in such a manner as to reduce the diameter of the collar, and the zone of the second end of the strap that is in register with the above-mentioned openings is indented to form a dimple. The indenting punch passes through the opening in the outer face of the buckle and drives the material of the second end of the strap through the opening in the first end of the strap and into the opening in the inner face of the buckle. Thus, the dimple in the second end of the strap is retained by the edges of said openings. The co-operation of the dimple lacks precision and, furthermore, Patent EP 1 775 220 proposes different shapes of dimple, some of which are complex and difficult to obtain, in order to mitigate that drawback. In addition, the dimple co-operates with the edge of the opening in the first end of the strap, or with the edge of the opening in the inner face of the buckle, or with both of those edges, if they are exactly aligned, these different modes of co-operation being random.

Thus, the behavior under traction of collars obtained in accordance with that patent can differ from one collar to another, with, depending on the collar, the tightening forces being exerted between the two ends of the strap or between the second end of the strap and the buckle, which is itself retained by the first end of the strap. That results in a lack of predictability about the behavior of the collar under traction, and in an uncontrolled risk of the tightening being degraded or indeed of breakage occurring.

A collar of the above-mentioned type is also known from U.S. Pat. No. 7,373,695, and in that collar the tightening is more precise. For that purpose, the first end of the collar passes under the inner face of the buckle, the portion of said first end that is situated in the buckle has an opening in register with an opening in the buckle, said opening in the buckle has an edge that is folded over outwards in such a manner as to penetrate into the opening in the first end of the strap, and the outer face of the strap is indented with the portion of the second engaged end of the buckle, in such a manner as to drive that portion into the opening in the first end of the strap, against the above-mentioned folded-over edge. It can be understood that that collar is very complex to manufacture, and such manufacturing requires very high precision. For example, if the folded-over edge of the opening in the inner face of the buckle projects too far radially into the buckle, it can hinder insertion of the second end into the buckle and can even adversely affect the quality and the precision of the indenting. In addition, the fact that the first end of the strap passes under the inner face of the buckle causes a large amount of extra inner thickness that can be detrimental, in particular when the article clamped by the collar is a pipe that must be clamped uniformly over its entire circumference.

The invention proposes to remedy those drawbacks of the state of the art at least in part.

This object is achieved by means of the fact that the second end of the strap has a retaining transverse stop received in the blocking setback and co-operating in abutment with a retaining edge of said blocking setback to retain the second end of the strap to prevent it from moving in the direction in which the diameter of the collar increases.

Thus, the collar is easy to manufacture because advantage is taken of the presence of the blocking setback that serves to block the buckle relative to the first end of the collar so that, when the collar is in the tightened state, the second end of the strap is retained to prevent it from moving in the diameter-increasing direction. The retaining stop is received in the blocking setback while being positioned correctly relative to said setback, and said retaining stop co-operates with an edge of said setback to achieve the above-mentioned retaining. In addition, the retaining edge co-operates not with an edge of the plate, but rather with the retaining edge that is formed directly in the first end of the strap. In other words, "strap-on-strap" retaining is achieved that does not exert any stress on the plate. The quality of the tightening is thus optimized.

In accordance with an option, the blocking transverse edge is a free edge situated on a first free end of the inner portion of the buckle.

In this situation, manufacturing the buckle is simplified because, unlike in the above-mentioned prior art, it is not necessary to form a central aperture through the buckle in order to block it relative to the first end of the strap.

For example, the blocking transverse edge is formed at the back of a notch in the first free end of the inner portion of the buckle.

Thus, the blocking setback can be received in said notch. Seen from inside the strap, the back of the setback can thus be situated at the same radius as the inner face of the buckle, on either side of the notch. The depth of the setback may decrease going away from the buckle, in such a manner as to avoid an abrupt shoulder on the inner face of the strap, this then guaranteeing improved sealing for the clamping of the collar when it is tightened around an article through which a fluid is conveyed, e.g. when it is tightened around a pipe fitted over a sleeve.

In accordance with an option, the retaining transverse stop defines a retaining setback that is formed in the second end of the strap.

In the zone of the retaining setback, the inside of the strap is work-hardened, which imparts good strength to the setback and to the retaining stop, thereby improving the quality of the tightening.

Provision may be made for the retaining setback to be defined by a transverse cutout and for the retaining stop to be formed on the lip of said cutout that is situated at the back of the retaining setback.

In other words, the retaining setback is formed by a partially cut plunged boss having a lip that forms the cutout edge and that co-operates retainingly with the retaining edge of the blocking setback. The precision of the positioning of the retaining stop is thus extremely high, as is the precision of its geometrical shape, because it is obtained by cutting out rather than by folding, so that considerations such as the thickness of the strap or the precision of its folding are not involved in the precision of the positioning.

In accordance with an option, the blocking setback forms a dish having one of its sides forming the blocking stop on its face outside the setback, and forming the retaining edge on its face inside the setback.

In this situation, the retaining edge is situated in a zone in which the material of the strap is work-hardened to a very great extent, and which thus has very high traction strength. The collar can thus be tightened with a very large tightening tension.

In accordance with another option, the blocking setback is defined by a transverse cutout, and the blocking stop is formed on the lip of said cutout that is situated at the back of the blocking setback, while the retaining edge is formed on the opposite lip.

In this situation, the precision of the positioning of the retaining edge relative to the retaining stop is high, which makes it possible to obtain precision tightening.

In accordance with an option, the inner portion of the buckle has an additional blocking transverse edge that faces towards the free tip of the first end of the strap and that co-operates with an additional blocking transverse stop of the first end of the strap that defines an additional blocking setback formed in said first end.

It is then possible to make provision for the additional blocking transverse edge to be a free edge situated on the second free end of the inner portion of the buckle.

The additional blocking edge is also formed at the back of a notch in the second free end of the inner portion of the buckle.

The blocking transverse edge and the additional blocking transverse edge may be formed in the same manner, symmetrically about a transverse midline of the inner portion of the buckle. These two blocking transverse edges may be formed simultaneously, by means of the same indenting operation, and with very high precision.

In accordance with an option, the buckle carries at least one radially projecting outer tab, the tab having the shape of a hook having a stem carrying a head under which a recess is formed.

As is explained in the detailed description, this outer tab facilitates positioning the collar relative to its tightening tool.

It is possible to make provision for the passage of the buckle through which the second end of the strap is inserted to include a restraint segment defined by at least one outer wall portion of the buckle situated above the outer face of the first end of the strap, and for the outer tab to be offset longitudinally relative to said outer wall portion.

The invention can be well understood and its advantages appear more clearly on reading the following detailed description of an embodiment that is shown by way of non-limiting example. The description refers to the accompanying drawings, in which:

FIG. 4 is a section view on the section plane IV-IV of FIG. 2;

FIG. 5 is a view analogous to the FIG. 4 view, but showing a variant embodiment;

In the present text, the term "inner" is used to describe an element that is situated closer to the geometrical center C of the circle defined by the collar, while the term "outer" is used to describe an element that is situated further away from said center C. In addition, the term "longitudinal" is used to describe an element that extends along the length of the strap, i.e. when the strap is looped back on itself as shown in the figures, an element that extends in the looping direction. The term "transverse" is used to describe an element extending perpendicularly to said length, i.e. across the width of the strap.

Figure 1:
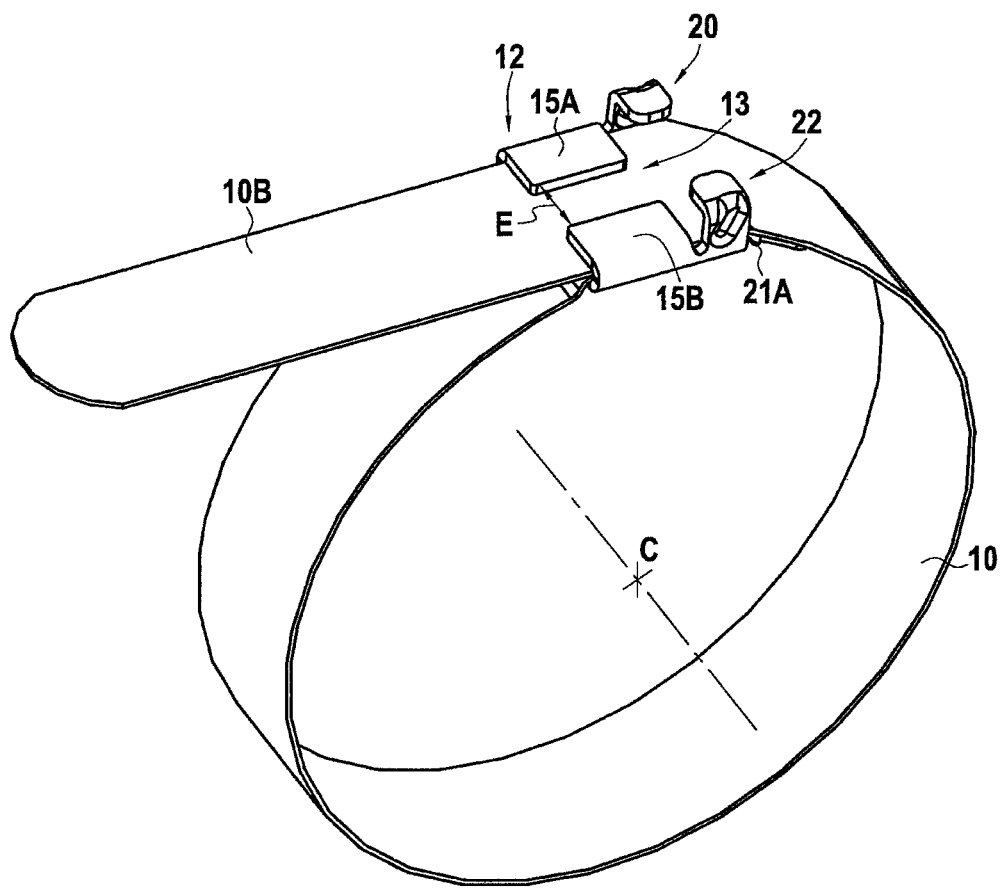
FIG. 1 is a perspective view of a clamping collar of the invention, before it is tightened.
Figure 2:
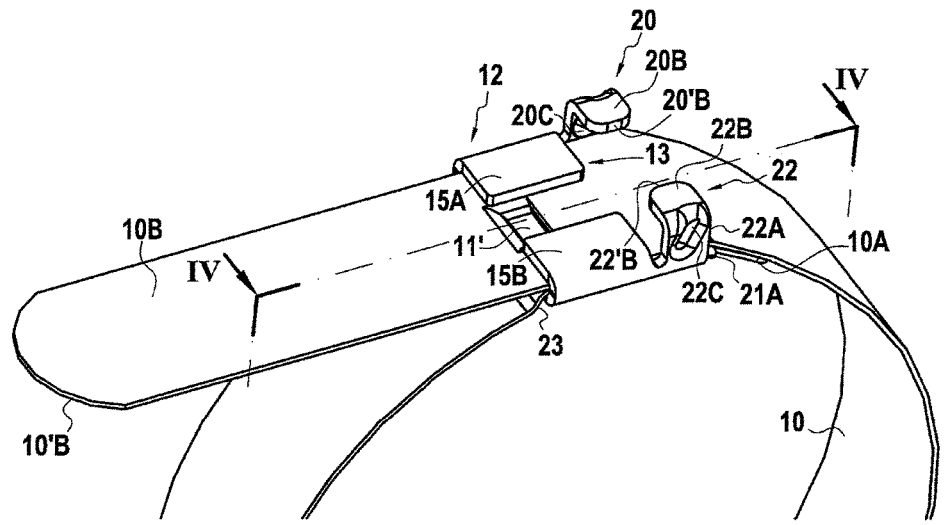
FIG. 2 is a fragmentary perspective view of the same collar, after it is has been tightened.
Figure 3:
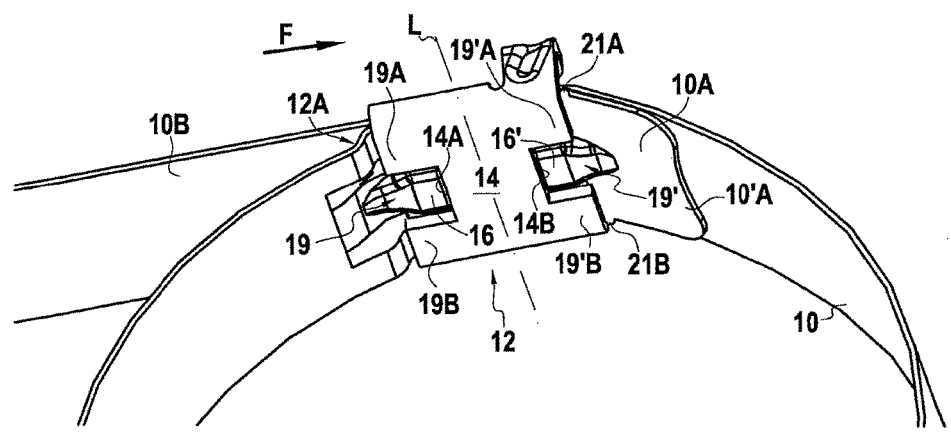
FIG. 3 is a perspective view showing the inner face of the strap of the collar of FIGS. 1 and 2, in the vicinity of the transverse buckle.

Firstly, a description is given of FIGS. 1 and 3, in which a clamping collar can be seen that comprises a looped metal strap 10 and a transverse buckle 12 retained at the first end 10A of the strap. As can be seen more clearly in FIGS. 1 and 2, on the outer side of the first end 10A, the buckle 12 forms a passage 13 through which the second end 10B is inserted.

In the meaning of the present specification, the "first end" of the strap is the entire segment of the first end that co-operates with the buckle. In the same way, the "second end" is the entire segment of the second end that co-operates with the buckle.

As can be seen more clearly in FIG. 3, the buckle 12 has an inner portion 14 disposed against the inner face of the first end 10A of the strap 10. On the outer side, the buckle has two outer wall portions, respectively 15A and 15B, each of which is folded over from a respective one of the longitudinal edges of the inner portion 14. These outer wall portions form tongues that are situated above the outer face of the first end 10A of the strap 10. The space defined radially between the inner faces of these folded-over tongues and the outer face of the end 10A of the strap forms a restraint segment of the passage 13, through which segment the second end 10B of the strap is caused to pass. The concept of "restraint segment" is used to mean that the radial height of said space is just sufficient to enable the second end 10B of the strap to be inserted through it, said second end thus being retained to prevent it from moving radially outwards.

It can be seen, in particular in FIGS. 3 and 4, that the first end 10A has a blocking setback 16 that contributes to blocking the buckle relative to the first end. As can be seen better in FIG. 4, this blocking setback 16 has a blocking transverse stop 16A that co-operates with a blocking transverse edge 14A of the inner portion of the buckle 12. In the example shown, this edge and this stop are rectilinear and extend transversely to the strap. Thus, the co-operation between the stop 16A and the edge 14A prevents the first end 10A of the strap from moving in the direction F (see FIG. 4) relative to the buckle 12.

For retaining it in the other direction, means analogous to the means described above are used. For this purpose, in the example shown, the inner portion of the buckle has an additional blocking transverse edge 14B that faces towards the free tip 10'A of the first end 10A of the strap and that co-operates with an additional blocking transverse stop 16'A in the first end of the strap. This additional blocking transverse stop defines an additional blocking setback 16' formed in said first end.

The additional blocking transverse stop 14B and the additional blocking setback 16' are generally symmetrical to the blocking transverse stop 16A and to the blocking setback 16 about a transverse midline L of the inner portion of the buckle. The co-operation between the stop 16'A and the edge 14B prevents the first end 10A of the strap from moving relative to the buckle 12 in the direction opposite to the direction F indicated in FIG. 4.

As can be seen more clearly in FIG. 4, the second end 10B of the strap has a retaining transverse stop 11 that is received in the blocking setback 16. This retaining transverse stop co-operates in abutment with a retaining edge 17A of the blocking setback 16. It can be understood that the co-operation between the retaining stop 11 and the retaining edge 17A prevents the second end 10B of the strap from moving relative to the first end 10A in the direction indicated by the arrow F in FIG. 4. In other words, once the collar has been tightened, this co-operation prevents the collar from coming loose.

The retaining transverse stop 11 defines a retaining setback 11' that is formed in the second end of the strap. This retaining setback 11' thus forms a projection on the inner face of the second end 10B of the strap, and, as can be seen in FIG. 4, the retaining setback is received in the blocking setback 16. It can be observed, in particular in FIG. 2, that the longitudinal edges of the retaining setback 11' form inwardly extending shoulders in which the material is work-hardened to a very great extent. The same applies to the transverse edge of the setback opposite from the retaining stop 11. As a result, the entire zone of the retaining setback has high strength. Thus, the retaining stop 11 can withstand particularly large forces.

The retaining setback 11' is defined by a transverse cutout, the retaining stop 11 being formed on the lip of said cutout that is situated at the back of the retaining setback, and that faces in the opposite direction to the direction in which the free tip 10'B of the second end of the strap faces. Said lip is rectilinear and extends transversely, and its geometrical shape is particularly clear-cut, so that the second end of the strap is retained with precision relative to the blocking transverse edge.

In this example, the blocking setback 16 forms a dish having one of its sides forming the blocking stop 16A on its face outside the setback 16, and forming the retaining edge 17A on its face inside the setback. Departing from the above-defined concepts of "inner" and "outer", the setback inside and outside faces are defined relative to the setback itself. In this example, since the setback forms a projection on the inner face of the first end 10A of the collar, the face outside the setback is situated on the inner face of the first end 10A, while the face inside the setback is situated on the outer face of said first end. Seen in section, as in FIG. 4, the side of the setback 16 that has the blocking stop 16A and the retaining edge 17A on respective ones of its two opposite faces is in the form of a radially extending shoulder that is substantially perpendicular to the inner face of the inner portion 14 of the buckle.

As can be seen more clearly in FIG. 3, the blocking transverse edge 14A is a free edge, situated on the first free end 12A of the inner portion 14 of the buckle 12. More precisely, in this example, the blocking transverse edge 14A is formed at the back of a notch 19 in the above-mentioned first free end 12A. On either side of the notch, longitudinally protruding branches 19A and 19B can be seen. The blocking setback 16 is received in the notch while being flanked on either side by the above-mentioned branches 19A and 19B. As can be seen in FIG. 3, the inner face of the setback 16 goes, in the vicinity of the back of the notch, from the radial level of the inner face of the inner portion 14 of the buckle, and returns gradually to the plane of the strap as it goes away from the back of the notch 19 so as not to form an abrupt shoulder in the inner face of the strap.

Conversely, it can be observed that the first end of the strap that is situated at the free end 12A of the inner portion of the buckle 12 forms an inwardly extending shoulder 23 so that the inner face of the strap that is situated on the side of said shoulder that is further away from the free tip 10'A of the strap is situated substantially in alignment with the inner face of the buckle 12. The height of the shoulder, as measured radially, corresponds substantially to the thickness Eb of the inner portion 14 of the buckle.

Like the blocking transverse edge 14A, the additional blocking transverse edge 14B is a free edge of the buckle, but it is situated at the second free end 12B of the inner portion 14 of the buckle that is opposite from its first free end 12A. This additional blocking edge 14B is also formed at the back of a notch 19' in the second free end 12B of the inner portion 14 of the buckle. This notch is thus flanked by longitudinal protruding branches 19'A and 19'B.

It can also be observed that, at the second free end 12B of the inner portion 14 of the buckle, the first end 10A of the strap has side projections 21A, 21B. These projections are formed by partial punching of the first end of the strap, which punching causes material to be driven transversely outwards. They form side "lugs" with which the free end 12'B of the buckle co-operates, and they thus contribute to retaining the first end of the strap to prevent it from moving in the direction opposite to the direction indicated by arrow F relative to the buckle 12. Thus, in the example shown, in order to retain the first end of the strap relative to the buckle in the direction opposite to the direction of arrow F, not only the above-mentioned side projections 21A and 21B are used, but also the additional blocking transverse stop 16'A co-operating with the additional blocking transverse edge 14B.

This makes it possible to obtain very high resistance to the forces exerted while the collar is being tightened. As indicated above, once the collar is tightened, it is maintained in the tightened state by "strap-on-strap" co-operation that takes place directly between the retaining transverse stop 11 of the second end of the strap and the retaining edge 17A of the blocking setback formed at the first end of the strap. However, during tightening, in order to exert traction on the second end of the strap in such a manner as to obtain the minimum clamping diameter, the tightening tool may press against the buckle 12 and it is therefore important for the buckle to be securely retained relative to the strap.

Naturally, it is possible to provide the retaining in the direction opposite from the direction F by means of the side projections 21A and 21B only, or else by means of the co-operation between the transverse stop 16'A and the transverse edge 14B only. It is also possible to choose some other mode of retaining available to the person skilled in the art.

The buckle 12 of the collar 10 has two outer tabs 20 and 22 that project radially. Each of the tabs is in the form of a hook with a stem, respectively 20A and 22A, and a head, respectively 20B and 22B, so that a recess D is formed under the heads 20B and 22B. This recess forms a segment of the passage 13, the second end 10B of the strap passing under the heads 20B and 22B of the hooks. However, as indicated above, it is the restraint segment of this passage, in the form of the folded-over tongues 15A and 15B that serves to retain the end 10B of the strap to prevent it from moving radially outwards.

In this example, the heads have free edges 20'B, 22'B that extend longitudinally. The stems extend facing each other, on either side of the buckle, starting from the longitudinal edges of its inner portion 14, the second end 10B of the strap passing between them for accessing the restraint segment of the passage 13.

The outer tabs 20 and 22 are offset longitudinally relative to the above-mentioned outer wall portions 15A and 15B. For example, each tongue of the buckle 12 in which an outer wall portion 15A or 15B is formed may initially be integral with the tab 20 or 22; a single transverse cutout separates the tab from the wall portion, and said wall portion is folded over until it is parallel with the inner portion 14 of the buckle 12, while the tab is shaped into a hook shape.

As explained below, these tabs serve to ensure that the collar and the tool that serves to tighten it are positioned properly relative to each other.

As can also be seen in FIG. 4, the depth P of the blocking setback 16, as measured radially from the plane of the outer face of the first end of the strap on either side of the setback, is at most substantially equal to the thickness Eb of the inner portion 14 of the buckle. In FIG. 4, the blocking setback is formed by the above-mentioned dish. Thus, the depth of this setback is not critical so long as it enables the inner face of the setback not to project inwardly relative to the inner face of the inner portion of the buckle 12.

This depth is more critical in the variant shown in FIG. 5, which is described below and in which the same numerical references are used as in the preceding figures, plus 100. In FIG. 5, the blocking setback 116 is defined by a transverse cutout. The blocking stop 116A is formed on the lip of said cutout which is situated at the back of the setback 116 and which is therefore directed towards the free tip 110'A of the first end of the strap. The depth P of the setback 116 corresponds to the thickness e of the strap so that, by coming to be received in this blocking setback, the portion of the second end 110B of the strap in which the retaining setback 111' is formed comes into the plane of the portion of the first end 110A that is situated against the outer face of the inner portion 114 of the buckle 112. In other words, in this situation, the retaining stop 111 is situated facing the lip 117A of the cutout that defines the blocking setback 116, and faces in the direction opposite from the direction in which the free tip 110'A of the first end of the strap faces. This lip 117A thus forms the retaining edge.

Figure 6:
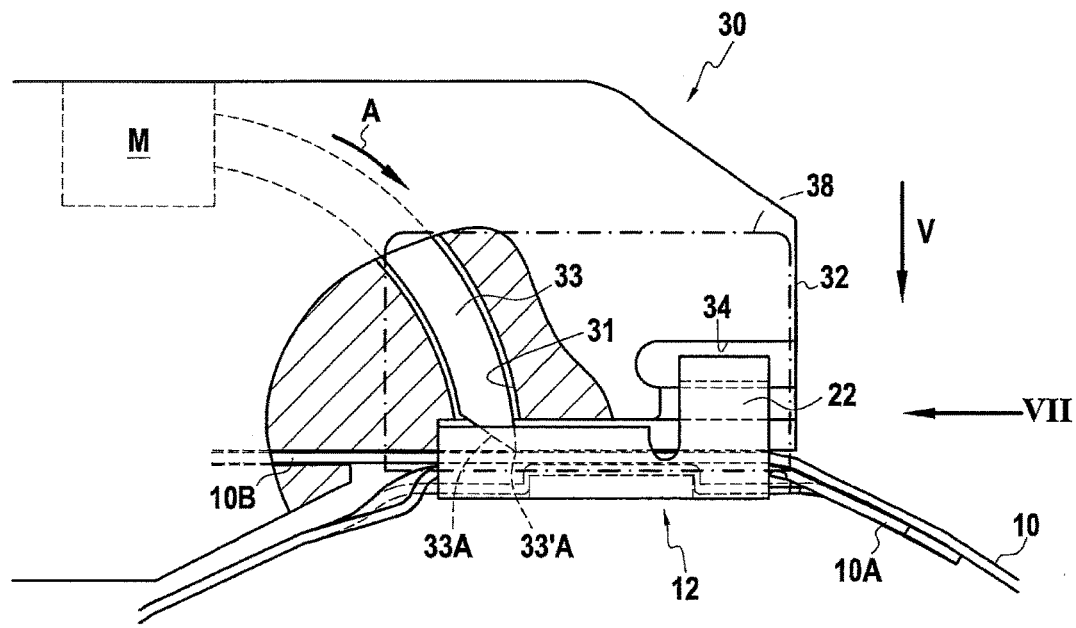
FIG. 6 is a diagrammatic side view showing how the collar of the preceding figures co-operates with its tightening tool.
Figure 7:
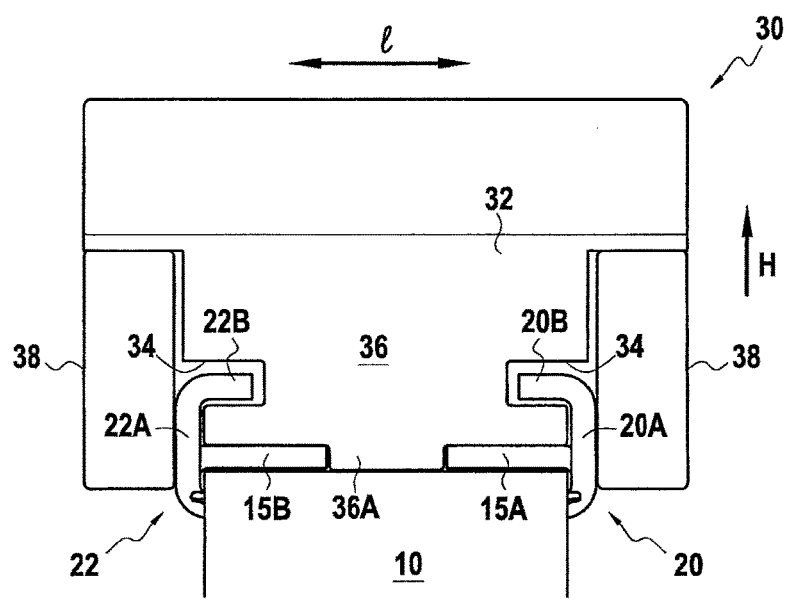
FIG. 7 is an end-on view seen looking along arrow VII of FIG. 6.

A description follows of FIGS. 6 and 7, which show how the collar co-operates with the tool that serves to tighten it.

For reasons of simplification, only the active portion of the head of the tool is shown. For more details, reference may be made, for example, to French Patent FR 2 542 388.

The portion of the tool 30 that is shown in FIGS. 6 and 7 comprises its head 32 and its punch 33 that, by an actuation system M, is moved inside a channel 31 to come to indent the second end 10B of the strap of the collar, and to form the retaining stop. In FIG. 6, the punch 33 is shown at the time at which it touches the strap of the collar, during its indenting movement in the direction indicated by the arrow A.

The collar is tightened by traction being exerted (by means not shown) on said second end, while the head of the tool is bearing against the buckle 12. Once the desired level of tightening is obtained, the punch 33 is moved to perform the indenting. It should be noted that the head 33A of the punch 33 is beveled and has a transverse cutting spike 33'A. It simultaneously forms the retaining stop 11 and the retaining setback 11'.

As indicated above, the tabs 20 and 22 serve to position the tool and the collar relative to each other. They also make it possible to position the buckle in a plane that is perpendicular to the indenting direction V of the punch.

More precisely, the tabs 20 and 22 are at least partially inserted into side setbacks 34. More precisely, it is the heads 20B and 22B of the hooks formed by said tabs that penetrate into said setbacks 34. The inner face of the head of the hook can thus co-operate with the face of the setback 34 that is situated facing it, so as to prevent the tool from moving relative to the collar in the direction indicated by the arrow H in FIG. 7.

In addition, insofar as two tabs 20 and 22 are present while being situated on respective ones of the longitudinal edges of the buckle 12, i.e. on either side of the longitudinal edges of the collar, a central portion 36 of the head of the tool that is situated on the inner side (towards the center of the collar) relative to the setbacks 34 is blocked between the stems 20A and 22A of the hooks formed by the tabs 20 and 22. This thus makes it possible to prevent the tool from moving laterally relative to the collar in the direction l. It should be noted that the head of the tool may have cheek plates 38 that close the setbacks 34 on the sides of said head, so that the means for receiving the tabs are in the form of hook-shaped slots. These cheek plates 38 can be seen in FIG. 7 and one of them is sketched in dot-dash lines in FIG. 6.

In the above-described collar, the buckle 12 is formed from a metal blank that is cut out and folded in suitable manner. In this example, the "join plane" of this blank as shaped into the buckle is situated on the outer side of the collar, between the folded-over tongues 15A and 15B. In this example, the longitudinal ends (free longitudinal edges) of said tongues are spaced apart by a width E. Firstly, this makes it possible to save material for the material of which the buckle is formed. Secondly, as can be seen in FIG. 7, this makes it possible to facilitate blocking the tool relative to the collar. The central portion 36 of the head 32 of the tool can thus have an inwardly projecting central rib 36A that is received in the space formed between the free ends of the tongues 15A and 15B, so that it can co-operate directly with the second end 10B of the strap of the collar. Conversely, the side projections that extend on either side of the central rib 36A, on the inner side of the setbacks 34, co-operate directly with the folded-over tongues 15A and 15B.

Considering the tabs 20 and 22 again, it can be seen that each of them has an inner rib, respectively 20C and 22C, at the junction between its stem and its head. The thickness of the inner ribs increases on going towards the head. For example, this can be achieved by gussets that are inclined substantially at 45 degrees relative to the radial direction, and that project towards the inside of the tabs. Thus, the ribs define between them, in the vicinity of the heads of the hooks, a width less than the width of the second end 10B of the strap. This makes it possible to avoid the operative thinking the collar has been closed merely by inserting the second end between the tabs 20 and 22. If the operative attempts to do so, the shape of the above-mentioned inner ribs acts naturally to drive the second end inwards (towards the center C of the collar), i.e. under the folded-over tongues 15A and 15B, into the restraint segment of the passage 13.

The invention claimed is:

1. A clamping collar comprising a looped metal strap, and a transverse buckle retained at the first end of the strap and forming, on the outer side of said first end, a passage through which the second end of the strap is inserted, the transverse buckle having an inner portion that is disposed against the inner face of the first end of the strap and that has a blocking transverse edge that faces in the opposite direction from the direction in which the free tip of the first end of the strap faces, and that co-operates with a blocking transverse stop of the first end of the strap that defines a blocking setback formed in said first end, the second end of the strap having a retaining transverse stop received in the blocking setback and co-operating in abutment with a retaining edge of said blocking setback to retain the second end of the strap to prevent said second end of the strap from moving in the direction in which the diameter of the collar increases.

2. The collar as claimed in claim 1, wherein the blocking transverse edge is a free edge situated on a first free end of the inner portion of the transverse buckle.

3. The collar as claimed in claim 2, wherein the blocking transverse edge is formed at the back of a notch in the first free end of the inner portion of the transverse buckle.

4. The collar as claimed in claim 1, wherein the depth of the blocking setback, as measured radially, is at most equal to the thickness of the strap.

5. The collar as claimed in claim 1, wherein the retaining transverse stop defines a retaining setback formed in the second end of the strap.

6. The collar as claimed in claim 5, wherein the retaining setback is defined by a transverse cutout and the retaining stop is formed on the lip of said cutout that is situated at the back of the retaining setback.

7. The collar as claimed in claim 1, wherein the blocking setback forms a dish, having one of its sides forming the blocking stop being formed on a face of a side of said dish, which is outside the setback, and the retaining edge being formed on another face of said side of said dish, which is inside the setback.

8. The collar as claimed in claim 1, wherein the blocking setback is defined by a transverse cutout, and the blocking stop is formed on a lip of said cutout that is situated at the back of the blocking setback, while the retaining edge is formed on an opposite lip.

9. The collar as claimed in claim 1, wherein the inner portion of the transverse buckle has an additional blocking transverse edge that faces towards the free tip of the first end of the strap and that co-operates with an additional blocking transverse stop of the first end of the strap that defines an additional blocking setback formed in said first end.

10. The collar as claimed in claim 9, wherein the blocking transverse edge is a free edge situated on the second free end of the inner portion of the transverse buckle.

11. The collar as claimed in claim 10, wherein the blocking transverse edge is formed at the back of a notch in the second free end of the inner portion of the transverse buckle.

12. The collar as claimed in claim 1, wherein the transverse buckle carries at least one radially projecting outer tab, said tab having the shape of a hook having a stem carrying a head under which a recess is formed.

13. The collar as claimed in claim 12, wherein the passage includes a restraint segment defined by at least one outer wall portion of the transverse buckle situated above the outer face of the first end of the strap, and the outer tab is offset longitudinally relative to said outer wall portion.

14. The collar as claimed in claim 1, wherein the depth of the blocking setback, as measured radially, is at most equal to the thickness of the inner portion of the transverse buckle.

* * * * *